Figure 1:
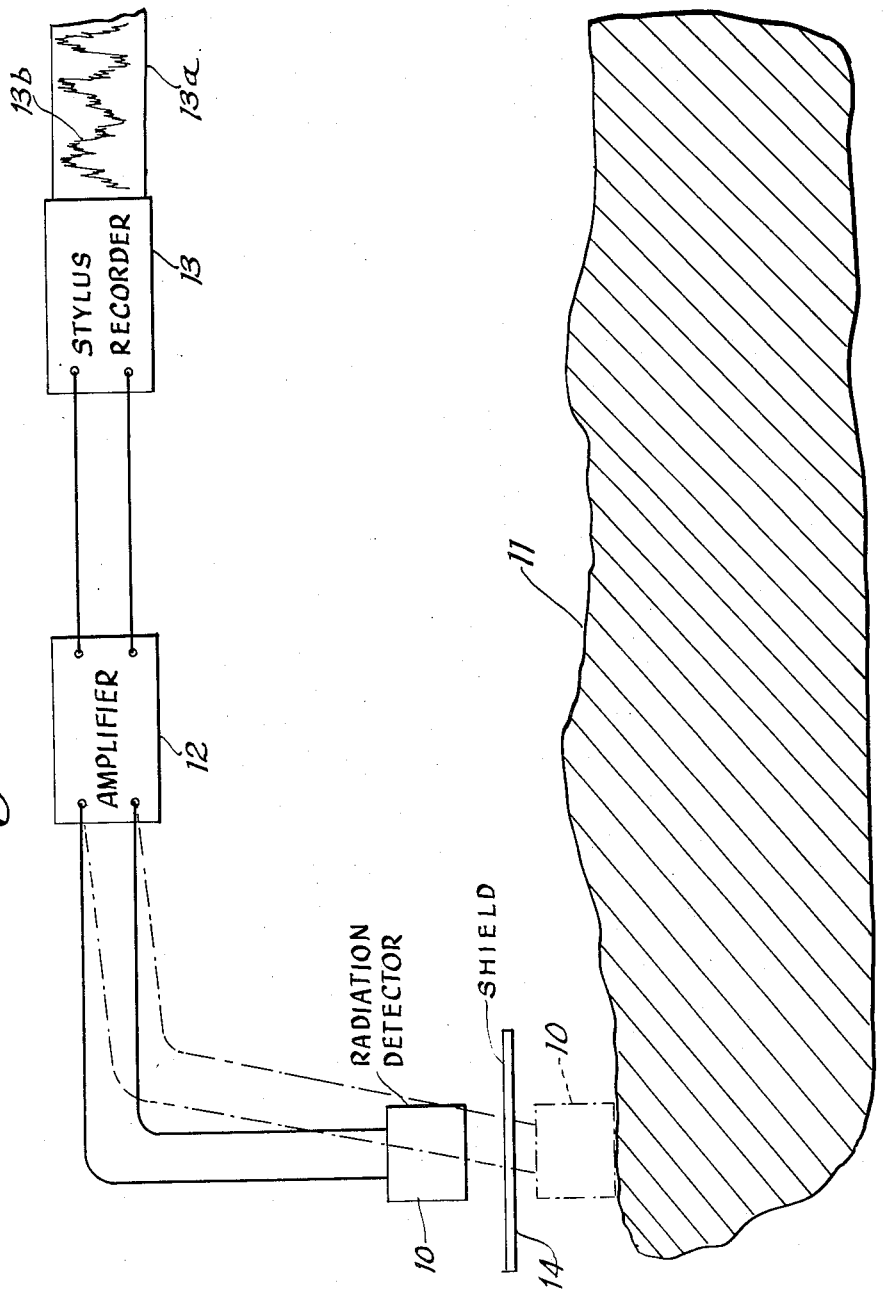

Oct. 17, 1950 J. T. CALLAHAN ET AL 2,526,326
METHOD OF GEOPHYSICAL PROSPECTING
Filed Dec. 23, 1948 3 Sheets-Sheet 3

INVENTORS.
John T. Callahan
John D. Lahmeyer
BY Mason, Kolehmainen, Rathburn & Wyss
Att'ys Patented Oct. 17, 1950

2,526,326

UNITED STATES PATENT OFFICE 2,526,326

METHOD OF GEOPHYSICAL PROSPECTING

John T. Callahan, La Feria, Tex., and John D. Lahmeyer, Tulsa, Okla., assignors to Industrial Nucleonic Devices, Tulsa, Okla., a corporation of Oklahoma Application December 23, 1948, Serial No. 66,986

13 Claims. (Cl. 250—83.6)

The present invention relates to methods of geophysical prospecting and more particularly to an improved method of obtaining information relative to subsurface geology by measuring variations in the radioactive energy radiated from the earth.

Various attempts have been made to determine the character of subsurface geological conditions, i. e., to identify the location, attitudes, character and contour of subsurface structures, by measuring at or near the surface of the earth the radioactive energy radiated from the earth or certain constituents thereof. It is generally recognized and field tests conducted in practicing the present invention have fairly reliably established that there is a definite and measurable relationship between subsurface geological conditions and the amount of radioactive energy radiated from the earth at the surface thereof. It has also been definitely established that only a portion of the radioactive energy detected at or near the surface of the earth is specifically correlatable with subsurface geological conditions. This is true for the reason that a large part of the radioactive energy detected at any point adjacent the earth's surface emanates from sources, such, for example, as the sun, other than the earth. This unwanted or spurious radioactive energy is sometimes referred to as "cosmic ray" energy. It is practically impossible to filter out this type of energy with any degree of success for several reasons. Thus the magnitude of the unwanted radioactive energy varies widely from detection point to detection point along the earth's surface and hence produces corresponding changes in the filtering requirements. Furthermore, unwanted radioactive energy of the character referred to has generally excellent penetration capabilities in so far as known types of shielding and filtering materials are concerned, which means that exceedingly heavy shielding or filtering structures must be employed even to obtain inadequate shielding or filtering. It has also been found that the magnitude of the unwanted radioactive energy influencing the detecting and measuring equipment at or adjacent the earth's surface in many cases equals or exceeds the magnitude of the radioactive energy which is significantly representative of subsurface geological conditions. Hence, the unwanted radioactive energy, which as stated above may vary widely from detection point to detection point over the surface of the earth, in many cases has the effect of partially or completely obscuring the significant radioactive energy sufficiently to render measurement of the latter energy substantially impossible. For the above-stated reasons, prior attempts to utilize the radioactive energy radiated from the earth as a source of information regarding subsurface geological conditions have not met with any degree of success.

It is an object of the present invention, therefore, to provide an improved method of geophysical prospecting.

It is another object of the invention to provide an improved method of geophysical prospecting, in which radioactive energy radiations from the earth or certain constituents of the earth are successfully relied upon to indicate subsurface conditions favorable to the location of mineral and hydrocarbon deposits.

According to another object of the invention, there is provided an improved geophysical prospecting method of the character described the accuracy of which is relatively unaffected by unwanted or spurious radioactive energy not directly derived from the earth.

It is still another object of the invention to provide an improved method of the character described which may be practiced to permit accurate correlation of the measurements made at a plurality of detection points, whereby contouring of the subsurface structure is made possible.

In accordance with a further object of the invention, there is provided an improved geophysical prospecting method of the character described which provides for the checking and cross-checking of the accuracy of significant measurements, whereby inaccurate data obtained at one or several detection points may easily be detected and discarded.

It is a still further object of the invention to provide a method of geophysical prospecting of the character described which may be practiced by relatively unskilled personnel; makes use of standard equipment of relatively low cost in the instrumentation thereof; employs compact, light weight equipment in the instrumentation thereof thus facilitating transportation of such equipment; and may be conducted to cover relatively large survey areas in relatively short periods of time.

Figure 2:
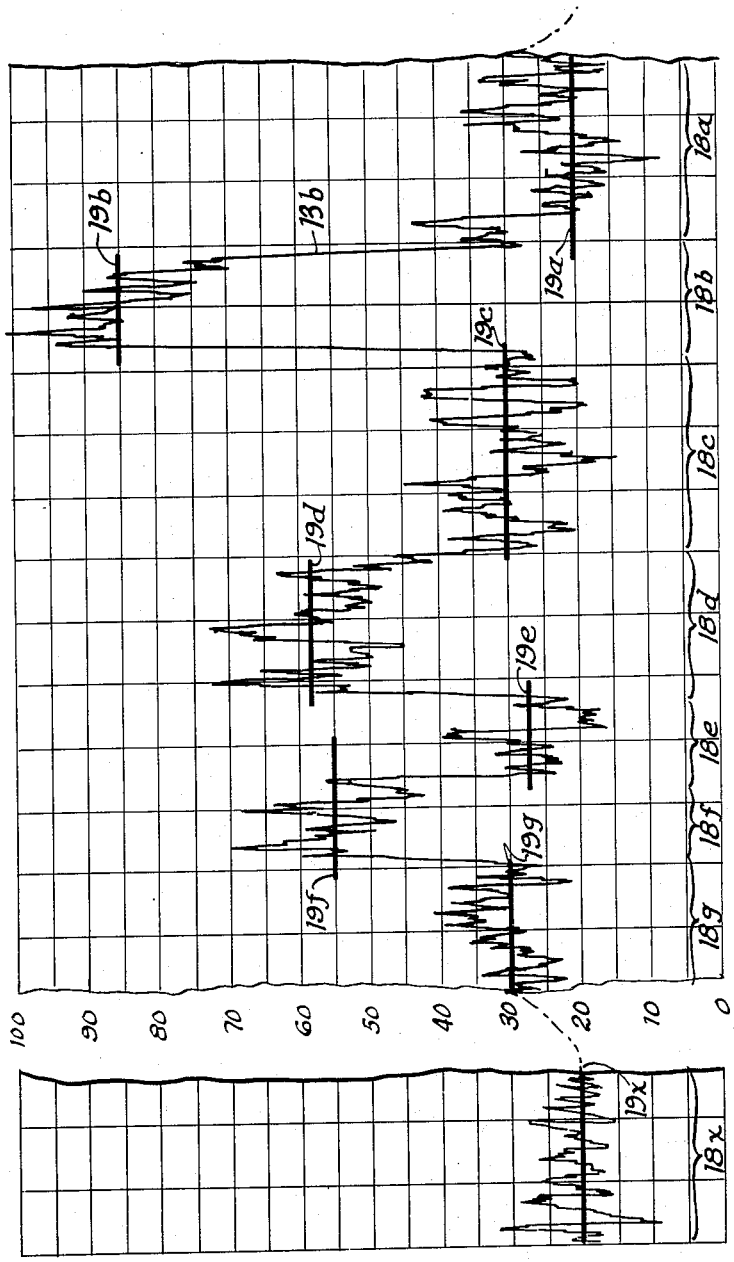
Figure 3:
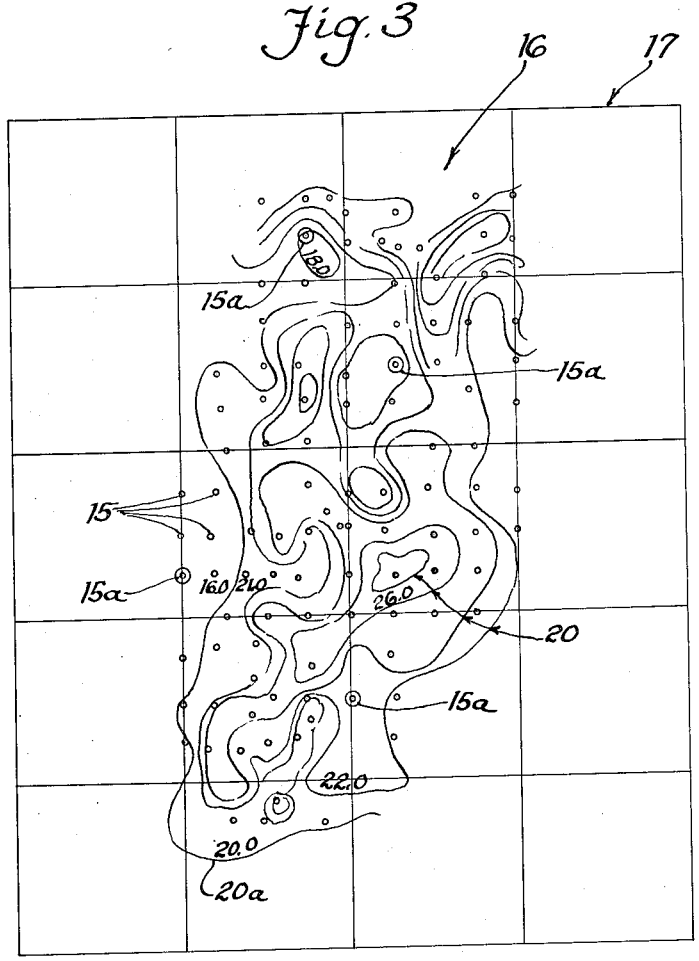

The invention, both as to the present improved method and the instrumentation thereof, will best be understood by reference to the following specification taken in connection with the accompanying drawings, in which:

Fig. 1 diagrammatically illustrates apparatus which may be employed in instrumenting the present improved method;

Fig. 2 illustrates a segment of a typical record record obtained through use of the equipment shown in Fig. 1; and Fig. 3 illustrates a typical survey grid and also the subsurface contour lines which may be produced as a result of the data obtained from records of the character shown in Fig. 2.

Referring now to the drawings and more particularly to Fig. 1 thereof, the apparatus for instrumenting the present improved method is there iullstrated as comprising a radiation detector 10 for converting detected radioactive emanations into corresponding electrical signals, a fixed gain amplifier 12 and a signal activated stylus type strip recorder 13, all connected in tandem in the order named. The radiation detector 10 may be of any desired commercial type having the required degree of sensitivity to radioactive energy impinging upon the target element thereof. For example, the detector 10 may be of the ionization chamber type of which several commercial embodiments are available. It performs the function of producing a signal across its output terminals having a magnitude which varies directly in accordance with the amount of radioactive energy impinging upon the target element thereof, and should be capable of accurately detecting radioactive energy in amounts substantially below the one m. e. v. level. The amplifier 12 may be of any desired commercial type having the required signal gain and frequency characteristics. Preferably this amplifier is designed to have a flat frequency response characteristics over the range of signal frequencies included in the signal impressed thereon by the detector 10. Similarly, the stylus recorder 13 may be of any standard commercial construction capable of faithfully reproducing the signal impressed upon the input terminals thereof as a record line 13b along a record strip 13a. Briefly, this recorder comprises a record moving mechanism arranged to drive the record strip 13a at constant speed, a pen type stylus for producing a record line 13b on the strip 13a which varies in position transversely of the strip in accordance with variations in the amplitude of the signal input to the recorder, and a signal responsive electro-mechanical mechanism for converting variations in the signal input amplitude into corresponding movement of the recording stylus transversely of the strip 13a. The apparatus employed in practicing the present improved method also comprises a shield 14 for preventing radioactive energy radiated from the earth from reaching the target element of the detector 10. This shield may comprise a plate formed of lead, aluminum or steel, or alternatively a layer of paraffin held within a suitable flat container.

In practicing the present improved geophysical prospecting method, the radiation detector 10 is successively located at a plurality of detection points 15 within an area under survey in the manner illustrated in Fig. 3 of the drawings. Each detection point 15 is geographically located through the use of conventional survey methods and if desired may be orientated with respect to a grid 17 including the area under survey. In this grid, the straight horizontal lines may represent township division lines whereas the straight vertical lines may represent range division lines, all of these lines being correctly identified accurately to locate the area 16 under survey. The spacing between the detection points 15 is of course determined by the degree of detail required in the information ultimately obtained on the subsurface geologically within the surveyed area. Moreover, in conducting a particular survey, no definite pattern need be followed in so far as the locations of the different detection points are concerned. For the purpose of checking instrument drift and changes in the amount of spurious or unwanted radioactive energy in the area under survey, however, it is desirable to designate certain of the detection points such, for example, as the points 15a as calibration or master points at which the survey runs may start and end.

Referring now more particularly to the manner in which the present improved method is practiced, it is pointed out that before a survey operation is started, the instrument components 10, 12 and 13 should be fully conditioned for operation. Moreover, the instruments should be maintained continuously operative during any one survey operation. With the instruments operating, the radiation detector 10 is first located above one of the surveyed calibration points 15a. In selecting the master or calibration detection points, it is desirable for instrument checking purposes to pick out one or more such points in which the detected radioactive energy level is relatively high and one or more additional master or calibration points in which the overall radioactive energy level is relatively low. This may conveniently be accomplished by transporting the equipment rapidly over the area under survey while conditioned for operation and with the radiation detector 10 exposed to radioactive energy from all available sources, including the earth, and noting the positions of the particular survey points at which the highest and lowest radioactive energy response levels are recorded on the continuously moving record strip 13a.

After the master or calibration points 15a have thus been selected, the radiation detector 10 is located immediately above one of the master or calibration detection points 15a and the shield 14 is disposed between the radiation detector 10 and the earth's surface 11 to intercept and prevent radioactive energy radiated from the earth 11 from reaching the target element of the detector. In certain areas, where the level of desired radioactive energy radiated from the earth is high relative to the level of the unwanted or spurious radioactive energy derived from other sources, air alone may be relied upon to produce the desired shielding effect which prevents the radioactive energy radiated from the earth from reaching the target element of the detector 10. It is important to note, however, that the extent or amount of shielding between the earth's surface 11 and the target element of the radiation detector 10 should be constant at the various detection points 15 and 15a. In other words, the spacing between the target element of the radiation detector 10 and the earth's surface 11 should be the same at each detection point 15 and 15a regardless of whether or not the shield 14 is employed. Maintenance of a constant spacing between the target element of the detector 10 and the earth's surface 11 is particularly important if the shield 14 is not used. In order to secure uniformity of results, moreover, the relative disposition of the shield 14 between the target element of the detector 10 and the earth's surface 11 should be the same at each detection point 15 since variation in the position of this shield relatively between the earth's surface 11 and the target element of the detector 10 can produce an appreciable change in the shielding effect.

After the radiation detector 10 has thus been located in an elevated position above one of the calibration or master detection points 15a, with or without the shield 14 interposed between this detector and the earth's surface 11, the equipment is allowed to operate for a short time interval of the order of five minutes. During operation of the equipment, radioactive energy detected at the target element of the detector 10 manifests itself in the production of an output signal across the output terminals of this detector which varies in amplitude in accordance with the energy level of the detected radioactive energy. This signal is amplified through the amplifier 12 and impressed upon the signal responsive electro-mechanical stylus actuating system of the recorder 13. Thus the stylus of the recorder 13 is caused to be variably positioned transversely of the record strip 13a in accordance with variations in the amplitude of the signal developed across the output terminals of the detector 10. As a result, the record line 13b is produced on the record strip 13a which follows the signal pattern in the manner typically illustrated in Figs. 1 and 2 of the drawings to produce quantitatively accurate record indications, varying as a function of time, of the amount of radioactive energy detected by the detector 10.

For purposes of this description, it may be assumed that with the detector 10 occupying a shielded position at one of the master or calibration detection points 15a, the record line segment 18a is produced on the record strip 13a. The average radiation level indicated by this segment of the record strip may be obtained by drawing a line 19a longitudinally of the strip approximately at the median point of the individual wave components making up this segment of the record in the manner illustrated in Fig. 2 of the drawings. This median line 19a represents with tolerable accuracy the level of the unwanted or spurious radiant energy detected by the radiation detector 10 at the particular calibration detection point at which the detector 10 is located. After this level is established, the radiation detector 10 is lowered directly into engagement with the earth's surface 11 at the selected detection point 15a in the manner illustrated in dash lines in Fig. 1 of the drawings. In other words, the shielding between the earth's surface 11 and the target element of the detector 10 is eliminated. Thus the detector 10 is unshielded so that it is rendered responsive to radioactive energy derived from all available energy sources including the earth itself. Since the last-mentioned source of radioactive energy is substantial in energy content, an appreciable rise in the magnitude of the measured radiation energy is manifested on the record strip 13a. The magnitude of the rise is directly related to and correlatable with the nature of the subsurface formation directly beneath the detection point. More specifically, with the detector 10 unshielded, i. e., disposed directly at the earth's surface 11, a record line segment 18b having an average energy level 19b may be produced on the record strip 13a. Depending upon the degree of accuracy required, the last described step may complete the detecting operation at the selected calibration detection point 15a. Although the described order of measuring steps, i. e., first measuring the radioactive energy with the detector in a raised position and shielded and then measuring the energy level with the detector on the earth's surface and unshielded, is preferable, it will readily be understood that this order of steps may be reversed if desired. It is also pointed out that if the first described sequence of measuring steps is followed and extreme accuracy is desired, a second detecting operation may be performed with the radiation detector 10 restored to its shielded position above the surface of the earth 11 and above the shield 14, if used, such that a second record line segment similar to the segment 18a is produced on the record strip 13a. This refinement permits before and after checking of the level of spurious or unwanted radioactive energy reaching the detector 10 from sources other than the earth.

After the described detection operation at one of the calibration detection stations 15a is completed, the apparatus is moved to a position wherein the radiation detector 10 is located at one of the non-calibration detection points 15. At this second detection point, the record line segment 18c having an average level 19c may be produced while the detector 10 is in a shielded position above the earth's surface 11. This record line segment is indicative of the spurious or unwanted radiation energy level at the selected detection point 15 and following production thereof, the detector 10 is placed directly on the earth's surface at the detection point to be responsive to radioactive energy from all sources, such that the record line segment 18d having an average level 19d is produced on the record strip 13a. After this record line segment is produced, the apparatus may be moved to locate the radiation detector 10 in a shielded position above the earth's surface 11 at a second non-calibration detection point 15, thereby to effect production of the record line segment 18e having an average energy level 19e. Thereafter, the detector 10 may be unshielded and positioned on the earth's surface 11 to cause production of the record line segment 18f which is characterized by an average energy level represented by the median line 19f.

From the foregoing explanation, it will be understood that as the survey operation proceeds, the radiation detector 10 is successively moved from detection point 15 to detection point 15 over the area 16 under survey. At each detection point 15, the apparatus is operated with the detector 10 occupying the described shielded and unshielded positions relative to the earth's surface 11. Thus the record is developed step-by-step in a manner which will be fully apparent from the preceding explanation.

After the dual radioactive energy detecting operations have been performed at the desired number of non-calibration detection points 15 in the manner explained above, the equipment is returned to a position wherein the detector 10 may be relocated at the original calibration detection point 15a from which the survey operation started. Upon relocating the detector 10 at the original detection point of the survey operation, a second record line segment 18x is produced on the record strip 13a with the detector 10 in its original shielded position above the earth's surface 11. If the average energy line 19x of this record line segment indicates a spurious or unwanted radioactive energy level equaling that represented by the line 19a of the first record segment 18a, an indication is provided that the spurious or unwanted radiation energy level has not changed during the survey operation and hence that the conditions, atmospherically, terrestrial or otherwise, giving rise to the unwanted or spurious radioactive energy have not changed. In other words, reasonable coincidence between the average energy levels represented by the median lines 19a and 19x indicates that the entire record may be relied upon for accuracy. On the other hand, if the spurious or unwanted energy level indicated by the position of the line 19x is appreciably different from the energy level represented by the line 19a, an indication is provided that an appreciable change has occurred in the conditions giving rise to the spurious or unwanted radioactive energy while the survey was in progress and hence that the record cannot be relied upon for accuracy. The importance of producing a continuous record and of tying the ending point of the record back to the starting point through the performance of starting and ending detection operations at the same calibration detection point thus becomes manifest. Another important feature of continuously logging the level of radioactive energy detected by the detector 10 on a continuous record strip is that of obtaining an indication of instrument drift. Thus if the detector 10 is maintained in a single position, shielded or unshielded from radioactive emanations from the earth, and the median line drawn through the wave components starts to drift in one direction or the other transversely of the record strip, an indication is provided that the constants of one or more components of the apparatus are changing to produce what may be termed instrument drift. This is an indication that the instruments should be adjusted or serviced to eliminate the instrumental drift before they are utilized further in survey operations.

It will be apparent from the foregoing explanation that if a plurality of master or calibration detection points 15a are employed, these points should be tied together by successively performing the described measuring steps at these detection points. Thus if a survey run is started and ended at one calibration detection point 15a, the next survey point selected should be another calibration detection point 15a and the radiation energy level should be continuously logged in proceeding from one calibration detection point to the other. It will also be understood that if high and low energy level calibration detection points 15a are selected, a greater opportunity is afforded for checking the accuracy of the instruments over a wide range of radioactive energy levels.

After the area under survey has been completely surveyed by performing the described shielded and unshielded radiation detection steps at each of the survey points 15 and 15a, the information accumulated on the record strip 13a or a plurality of such strips may be employed to produce a contour chart of the character illustrated in Fig. 3 of the drawings which is indicative of the topography of subsurface formations beneath the area under survey. Skilled interpreters by consulting these contour charts and interpreting the topography of the subsurface structures are able to predict with a high degree of accuracy subsurface geological conditions favorable to the location of mineral and hydrocarbon deposits. Thus, by interpretation of contour charts such as that shown in Fig. 3 of the drawings, such geological structures and conditions such as faults, pinch-outs, lenticulan lensings of sand bodies, and porosity and permeability changes as they relate to the production of hydrocarbons, gases and other minerals, may be detected.

In converting the information contained on the record strip 13a or a plurality of such strips into a contour chart of the character illustrated in Fig. 3 of the drawings, each record line segment 18a, 18b, 18c, 18d, etc., is of course definitely correlated with the particular detection point 15 or 15a at which the segment is produced. Further, and considering the two record line segments 18a and 18b by way of example, the transverse displacement between the median lines 19a and 19b is scaled to determine the difference in the measured energy level with the detector 10 shielded and unshielded at the particular detection point 15a at which the record line segments are produced. The particular system of units in which this energy differential is measured is of no importance so long as the same scale is employed for all detection points. When the described energy differential is scaled to determine the magnitude of the differential, the scaled value is inscribed on the chart shown in Fig. 3 of the drawings in small figures adjacent the particular detection point at which the differential was logged. This process is repeated for each of the other detection points 15 and 15a within the area under survey. After the energy differentials obtained at each of the detection points have been inscribed on the chart adjacent the respective detection points, the contour lines 20 may be drawn, each of which is representative of a constant radioactive energy differential level. Thus the contour line 20a is the locus of all points having an energy differential level of twenty units as scaled on the scale employed in the chart illustrated in Fig. 3 of the drawings. Suitable numerical designations have been applied to the contour lines of this chart to show the relative energy differentials which they respectively represent. While the present invention is not concerned with interpretation of the contour charts, it is generally true that the rate of change of energy differentials in any given direction across such a contour chart, as indicated by the disposition of the contour lines and the energy differentials which adjacent lines represent, is indicative of the likelihood of an anomalous condition favorable to hydrocarbon or mineral deposits existing in the subsurface structure beneath the surveyed area. For example, a large rate of change in the energy differential along a line drawn across the contour chart is highly indicative of a subsurface fault. Conversely, a small or no rate of change in the energy differential along a line drawn across the contour chart is highly indicative that no anomalous condition favorable to the existence of mineral or hydrocarbon deposits is present in the earth's subsurface structure beneath the line drawn across the chart.

Another important advantage derived from converting the data logged on the record strips 13a into contour charts of the character shown in Fig. 3 of the drawings is that of detecting erroneous energy differential measurements at one or more particular detection points 15. Thus if the measured energy differential at a particular detection point 15 does not fit into the general pattern of the contour lines, an indication is provided that this measured energy differential is inaccurate.

Inaccurate measurements of this character not infrequently occur, due to the detection of short bursts of unwanted radioactive energy at particular detection points or sudden bursts of atmospheric energy reaching the instruments to produce a spurious response of the recorder 13 while the detector 10 is located at particular detection points. However and as indicated above, the erroneous energy differential measurements attributable to these and other causes are easily detectable as the contour lines 20 are drawn to produce the contour chart.

From the preceding explanation, it will be understood that the present invention affords a completely reliable method of geophysical prospecting which utilizes information derived from variations in the radioactive energy radiated from the earth at the surface thereof. More specifically, the present invention affords a simple and reliable geophysical prospecting method of the character described in which the problem of eliminating the effects of unwanted or spurious radioactive energy radiated from sources other than the earth is completely solved. Moreover, the above description serves to emphasize the simplicity of the method as well as the simplicity of the instrumentation employed in practicing the method. It will also be apparent that the method may be reliably practiced by relatively non-skilled personnel and that the dual detection steps performed at the various detection points of a given survey area may be carried out with a high degree of rapidity.

While one embodiment of the invention has been described, it will be understood that various modifications may be made therein which are within the true spirit and scope of the invention as defined in the appended claims.

What is claimed as new and desired to be secured by Letters Patent is:

1. The method of geophysical prospecting which comprises, at least partially shielding a radioactive energy detector from radioactive energy radiations from the earth, eliminating the shielding, and measuring the radio active energy reaching said detector both when shielded and unshielded to determine the relative magnitudes thereof.

2. The method of geophysical prospecting which comprises, measuring the total radioactive energy reaching a radioactive energy detector located adjacent the surface of the earth, at least partially shielding the detector from radioactive energy radiated from the earth, and measuring the radioactive energy reaching the detector while shielded.

3. The method of geophysical prospecting which comprises, at least partially shielding a radioactive energy detector from radioactive energy radiations from the earth, and measuring the radioactive energy reaching the detector when shielded, eliminating the shielding, and measuring the radioactive energy reaching the detector when unshielded.

4. The method of geophysical prospecting which comprises, at least partially shielding a radioactive energy detector from radioactive energy radiations from the earth, and measuring the radioactive energy reaching the detector when shielded, eliminating the shielding, measuring the radioactive energy reaching the detector when unshielded, at least partially reshielding the detector from radioactive energy radiations from the earth, and measuring the radioactive energy reaching the detector when reshielded.

5. The method of geophysical prospecting which comprises, locating a radioactive energy detector adjacent the earth's surface, measuring the total radioactive energy reaching the detector, relocating the detector farther away from the earth's surface, locating a shield between the detector and the earth's surface, and measuring the radioactive energy reaching the detector while shielded.

6. The method of geophysical prospecting which comprises, locating a radioactive energy detector above the earth's surface, locating a shield between the detector and the earth's surface, measuring the radioactive energy reaching the detector, relocating the detector in an unshielded position closer to the earth's surface, and again measuring the radioactive energy reaching the detector.

7. The method of geophysical prospecting which comprises the step of measuring the difference between the total radioactive energy reaching a radioactive energy detector located at the earth's surface from all sources and the same total radioactive energy reduced by at least a part of the radioactive energy radiations from the earth toward said detector.

8. The method of geophysical prospecting which comprises, locating a radioactive energy detector successively at a plurality of detection points, and measuring at each detection point the difference between the total radioactive energy reaching the detector from all sources when unshielded and the radioactive energy reaching the detector when shielded from at least a portion of the radioactive energy radiated from the earth toward the detector.

9. The method of geophysical prospecting which comprises, locating a radioactive energy detector successively at a plurality of detection points, measuring at each detection point the difference between the total radioactive energy reaching the detector from all sources and the same total radioactive energy reduced by at least a portion of the radioactive energy radiated from the earth toward the detector, relocating the detector at one of said plurality of detection points, and repeating at least a part of said energy difference measuring step.

10. The method of geophysical prospecting which comprises, locating a radioactive energy detector successively at a plurality of detection points, measuring at each detection point the difference between the total radioactive energy reaching the detector from all sources and the same total radioactive energy reduced by at least a portion of the radioactive energy radiated from the earth toward the detector, relocating the detector at one of said plurality of detection points, and measuring the total radioactive energy reaching the detector from all sources as reduced by said portion of the radioactive energy radiated from the earth toward the detector when the detector is relocated at said one detection point.

11. The method of geophysical prospecting which comprises, locating a radioactive energy detector successively at a plurality of detection points, measuring at each detection point the difference between the total radioactive energy reaching the detector from all sources and the same total radioactive energy reduced by at least a portion of the radioactive energy radiated from the earth toward the detector, relocating the detector at the first of said plurality of detection points, and repeating at least a part of said difference measuring step 12. The method of geophysical prospecting which comprises, locating a radioactive energy detector successively at a plurality of detection points, measuring at each detection point the difference between the total radioactive energy reaching the detector from all sources when unshielded and the radioactive energy reaching the detector when shielded from at least a portion of the radioactive energy radiated from the earth toward the detector, and maintaining substantially constant the extent of shielding at each of said detection points.

13. The method of geophysical prospecting which comprises, locating a radioactive energy detector successively at a plurality of detection points, measuring at each detection point the difference between the total radioactive energy reaching the detector from all sources when unshielded and the radioactive energy reaching the detector when shielded from at least a portion of the radioactive energy radiated from the earth toward the detector, maintaining substantially constant the extent of shielding at each of said detection points, relocating the detector at one of said plurality of detection points, and repeating at least a part of said difference measuring step when the detector is thus relocated.

JOHN T. CALLAHAN.
JOHN D. LAHMEYER.

REFERENCES CITED

The following references are of record in the file of this patent:

Ridland: Translations of A. I. M. M. E., vol. 164, Geophysics, 1945, pp.117–124.

Evans et al.: Review of Scientific Instruments, vol. 10, Nov. 1939, pp. 332–336.